(No Model.) 3 Sheets—Sheet 1.
A. H. EMERY.
PLATFORM SCALE.
No. 278,902. Patented June 5, 1883.
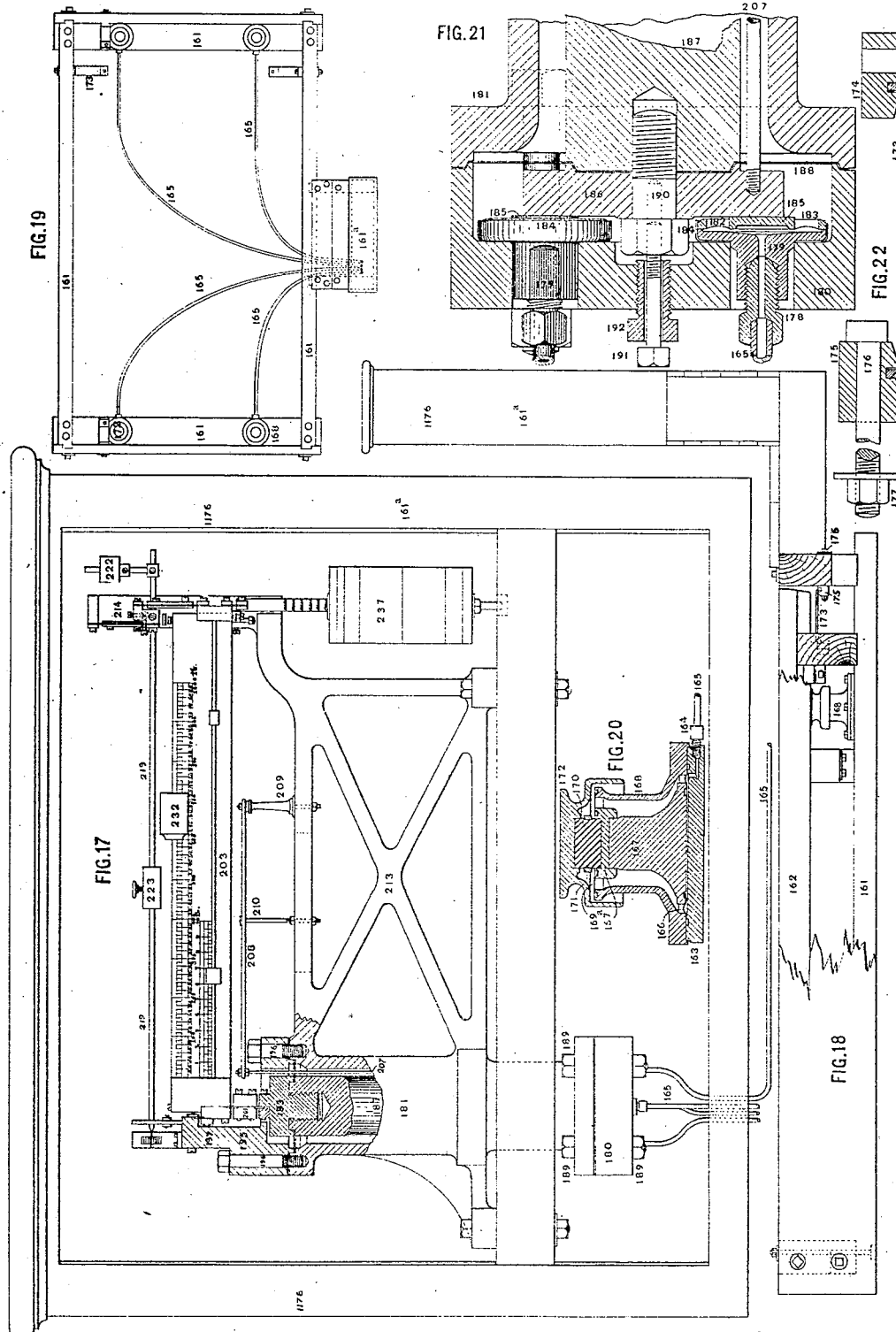
WITNESSES.
Walter Allen
Hattie E. Knight
INVENTOR Albert H. Emery
by Knight Bros. attys

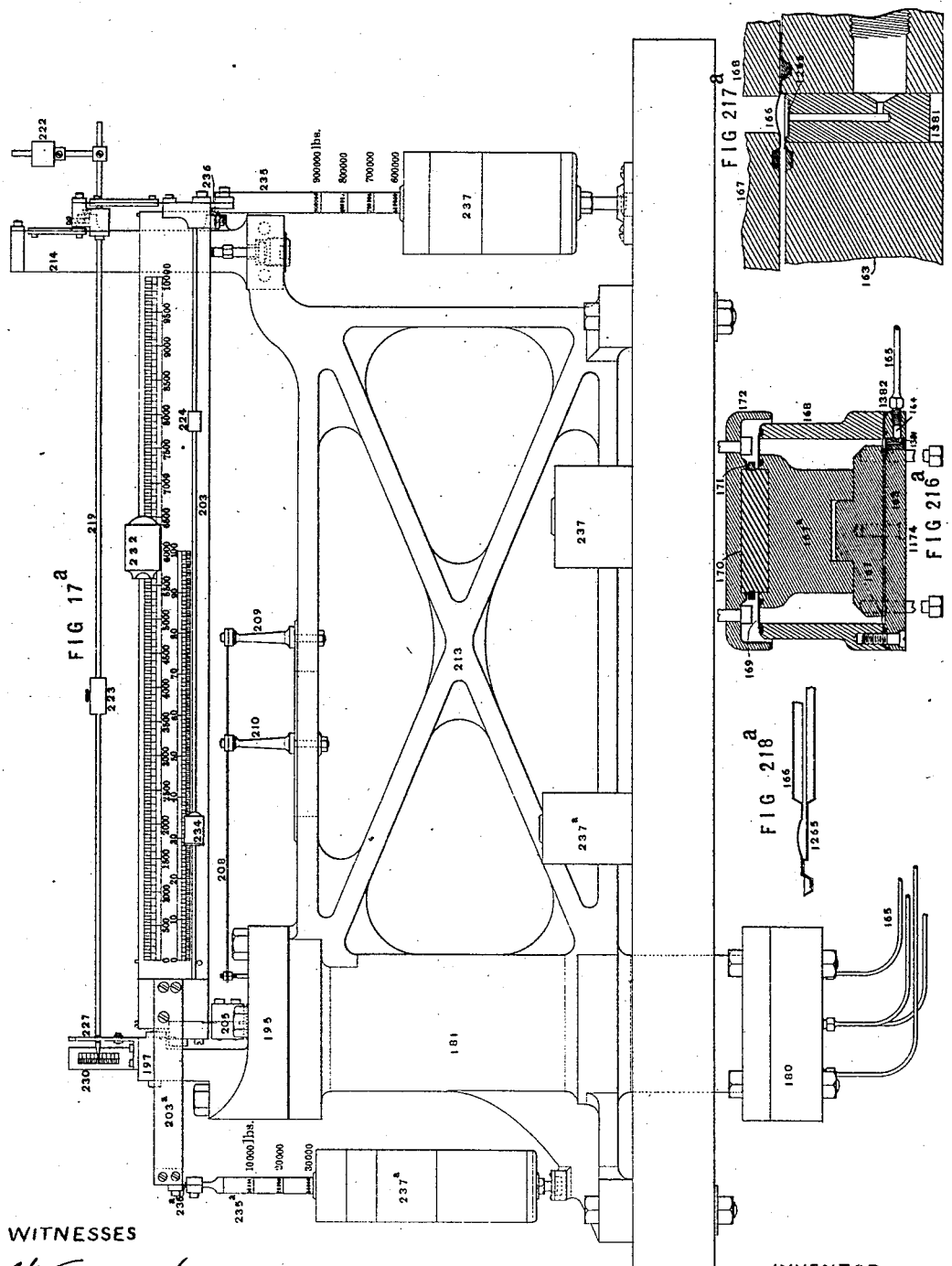

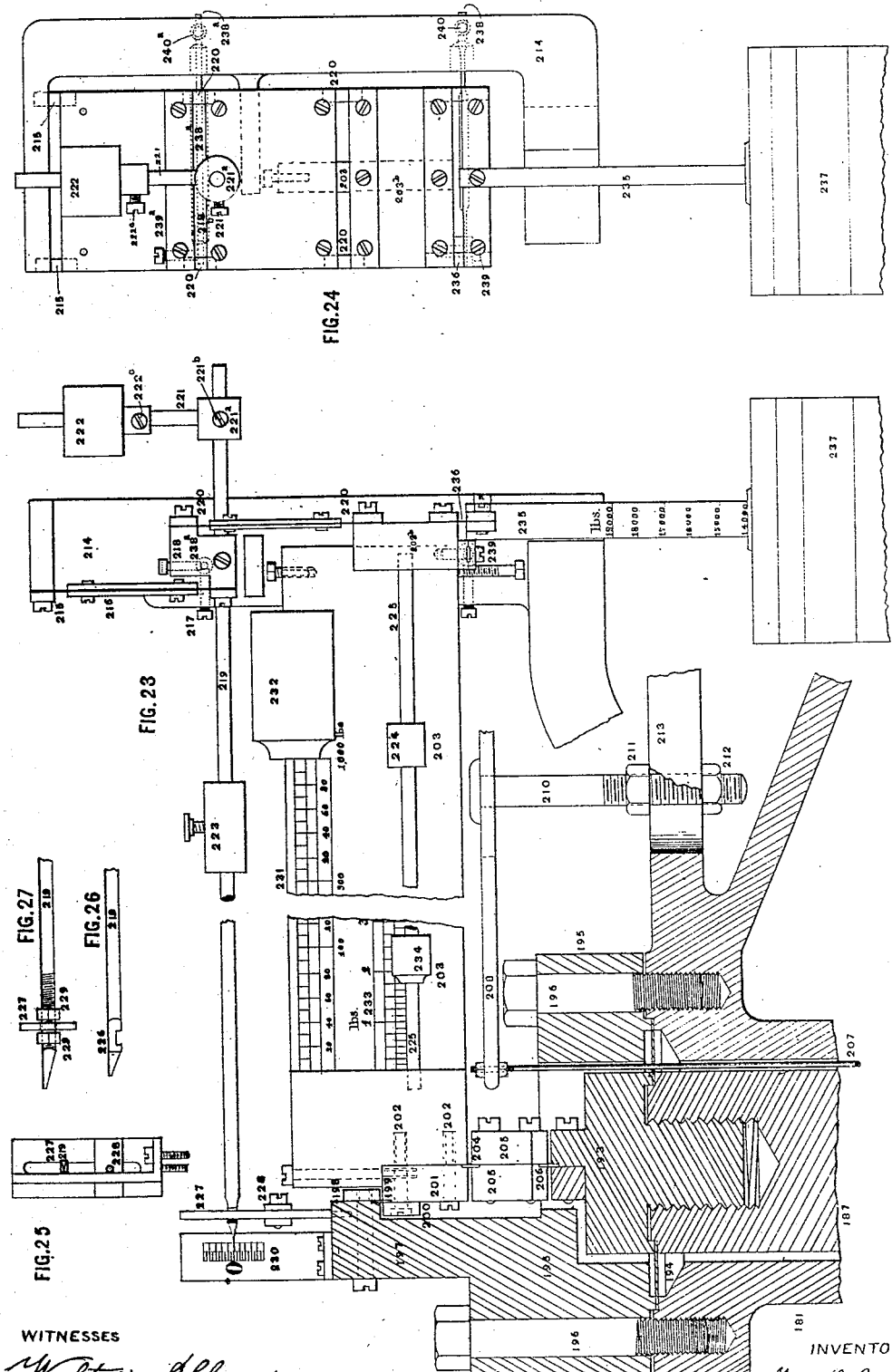

UNITED STATES PATENT OFFICE.

ALBERT H. EMERY, OF NEW YORK, N. Y., ASSIGNOR TO THE EMERY SCALE COMPANY, OF STAMFORD, CONNECTICUT.

PLATFORM-SCALE.

SPECIFICATION forming part of Letters Patent No. 278,902, dated June 5, 1883.

Application filed February 5, 1881. (No model.)

*To all whom it may concern:*

Be it known that I, ALBERT H. EMERY, of the city, county, and State of New York, have invented certain new and useful Improvements in Scales, of which the following is a specification.

The subject of this invention is a scale in which the pressure is transmitted from a load-platform to the weigh-beam through the medium of liquid confined in suitable chambers. The platform is secured against horizontal movement by thin flexible plates, which are strained by screws and nuts to adjust and fix the platform in horizontal position. A number of movable liquid-pressure chambers under the platform communicate by separate pipes with an equal number of small chambers with pressure-columns bearing on the main column of the weigh-beam. The liquid-pressure pipes are coupled to the small pressure-column chambers by hollow screw-plugs attached permanently to the ends of the pipes, and in some cases levers are employed to receive the pressure from the small chambers and transmit reduced pressure to the column which acts on the weigh-beam. The main column is stayed horizontally by flexible plates clamped to the top and bottom and to the surrounding casing, and for adjustment and shipping is fixed against vertical movement by set-screws. The fulcrum-joints of the beam are formed of thin flexible plates inserted in gaging-notches and securely clamped at their edges. The stationary pillar surrounding the pressure-column has a removable head with an upwardly-projecting lug for the fulcrum attachment of the beam. The pressure-column has a removable head surmounted by an intermediate column flexibly connected with it and with the beam to permit to the latter a slight horizontal play, due to the attachment of its flexible fulcrum and transmitting-plates on different levels. To compensate for changes in the liquid-pressure due to variations in temperature, the upward pressure on the column is opposed by a spring and a long rod of more expansible metal than the column attached adjustably to the main frame. The weigh-beam carries a supplemental weight-rod parallel with the main beam, moving in unison therewith, and having separate weights for balancing and weighing. From the free end of the beam a weight-rod is suspended by a flexible plate. To this rod the primary weighing-weights are applied, and the said rod is marked with graduations and numbers, so that the number appearing directly above the uppermost weight will indicate the effect or value on the scale of the whole number of weights which may be in position on the weight-rod at any time. To the fulcrum end of the weigh-beam is rigidly secured a supplemental beam projecting beyond the fulcrum. To the extremity of this supplemental beam is suspended by a flexible plate a supplemental rod carrying weights which counteract the primary weighing-weights, and are removed as required to balance the load on the platform, the removal of the supplemental weights suspended from the fulcrum end of the beam and beyond the fulcrum having the same effect as the addition of weights at the weight end of the beam. The weight end of the beam connects by flexible plates with an indicator-rod or secondary beam having much greater angular motion, carrying a movable weight, and working at its extremity within a guide and in proximity to a graduated indicator-plate. The vertical play of the indicator-rod is limited by an adjustable stop. Suitable stops are also provided to check its longitudinal movement. On a rear projection of the indicator-rod is mounted adjustably a standard carrying a vertically-adjustable weight, which, being above the center of motion of the rod, increases the sensitiveness of the scale by exerting an increasing or decreasing leverage as the rod is deflected upward or downward. The beam and indicator-rod are each stayed against lateral motion by flexible rods or plates fixed to the stationary frame or case, and connected, respectively, with the weight end of the main beam and with the fulcrum-bracket of the indicator-rod. Springs are interposed between the platform and its supports to prevent shock. For filling the pressure-chambers with liquid, openings are provided, and vents to permit the escape of air displaced by the pressure-liquid, the filling-openings and air-vents being securely closed by plugs after the pressure-chambers are filled.

In the accompanying drawings, Figure 17 is a front elevation, partly in section, of the weighing apparatus without the platform and platform-frame. Fig. 18 is a side elevation, partly in section, of the entire apparatus on a smaller scale. Fig. 19 is a plan of the platform-frame and supports thereof, also on a smaller scale, omitting the platform. Fig. 20 is a vertical section of one of the platform-supports. Fig. 21 is a vertical section of the base of the beam-frame pillar, and of its pressure-column and its accessories. Fig. 22 is a vertical section of a stay-plate and attachments for adjusting and holding the platform horizontally. Fig. 23 is a front elevation of the two ends of the beam and its accessories, showing parts of the supporting-frame, pillar, and pressure-column, and the pillar-head and pressure-column head. Fig. 24 is an elevation of the weight end of the beam and its attachments. Fig. 25 is an elevation of the indicator-rod, guide-plate, and indicator-plate. Fig. 26 is a plan of the end of the indicator-rod. Fig. 27 is a plan illustrating a modification in the construction of the rod, with adjustable stops applied thereto. Fig. 17ª represents a front elevation of the weigh-frame, beam, and attachments suitable for a scale of very large capacity. Fig. 216ª is a vertical section of a hydraulic-pressure support adapted for scales of very large capacity. Figs. 217ª and 218ª are sections showing some details of the said support on a larger scale.

161 represents a stationary bed or frame for the reception of a load-platform, 162, which rests on four supports, more or less, preferably constructed substantially as shown in Fig. 20. This support I have described and claimed in another application for Letters Patent. The present application does not relate to any peculiar construction of support, and is not limited thereto. As here illustrated, the support is constructed as follows: A base-plate, 163, receives the nozzle 164 of one of the liquid-conducting pipes, 165, in an orifice leading from a liquid-chamber formed in the upper surface of the base-plate, and covered by a diaphragm, 166, fastened to the base, at its periphery, by soldering or otherwise, and similarly secured at its inner edge to the bottom of the support-column 167. The upper part of the column consists of a flanged head, 167ª, removable from the base of the column, and permanently secured to the external shell or casing, 168, by a thin flexible stay-plate, 169, soldered or otherwise secured in grooves formed for it in the column-head and casing, as shown. The column-head receives on top a solid rubber spring, 170, which is encircled by a ring, 171, to confine it. A flange or bell-shaped cap, 172, rests on the spring 170, and extends outward and downward over the top of the casing to shield and protect the working parts.

Fig. 216ª shows a modified construction of support. Fig. 217ª shows the sealing devices on a larger scale.

The platform is adjusted horizontally, and secured against horizontal movement by stay-plates 173, fastened at their respective ends to lugs 174 and 175, Fig. 22, one bolted permanently to the platform, and the other connected to the frame by a straining-bolt, 176, and nut 177; or, if preferred, the permanent attachment is made to the stationary frame and the straining attachment to the platform. In some situations the most convenient access to the nuts 177 can be had by placing them on the outside of the frame. If the frame be surrounded by walls, so as to be unapproachable from the outside, the nuts can be placed on the inside and reached through openings in the platform; or by placing the stay-plates on top and the lugs beneath, as shown in Fig. 18, the nuts 177 may be approached from below.

The liquid-pipes 165 for transmitting pressure from the support-columns 167 communicate through screw-nozzles 178 with chambers 179, set removably in the base 180 of the pillar 181, as shown in Fig. 21. The chambers are covered by diaphragms 182, fastened at their peripheries by rings 183, the joint being secured by a sealing-ring, 184, on the outside, extending beneath the enlarged head of the chamber-piece. The pressure is communicated to a small column, 185, and on these columns 185, which in the present illustrations are four in number, (there being one for each chamber,) the base 186 of the main pressure-column 187 rests.

The lower end of the pressure-column 187 and its base 186 are secured against horizontal motion by a flexible annular stay-plate, 188, the inner edge of which is clamped between said column and its base, while the periphery of the plate is clamped between the pillar-base 180 and pillar 181. The pillar 181 and base 180 are fastened together by bolts and nuts 189, Fig. 17. The column 187 and its base-plate 186 are fastened together by a strong central tap-bolt, 190, Fig. 21, which is itself tapped with a central threaded opening to receive a screw, 191, which is fitted loosely within a hollow bolt, 192, screwed into the center of the pillar-base 180. By means of the combined screws 191 and 192, the latter limiting the descent of the column and the former firmly holding it down, the said column may be fixed rigidly in position for transportation, or in setting up and adjusting any part of the scale when required.

The column 187 is formed at top with a removable screw-head, 193, Figs. 17 and 23, which clamps the inner edge of a flexible annular fixing-plate, 194, the outer edge of which is clamped between the removable pillar-head 195 and the pillar 181, which are fastened together by bolts 196.

The removable pillar-head is constructed with an upwardly-projecting lug or standard, 197, to which is clamped, by a plate, 198, a thin flexible compression-plate, 199. The lower edge of this plate is clamped by a plate, 200, to a fulcrum-block, 201, secured by screws 202 to the heel of the beam 203. The fulcrum-block 201 also clamps at its lower edge a flexible transmitting-plate, 204, connecting it with an intermediate column, 205, which is connected by another thin transmitting-plate, 206, with the head 193 of the main pressure-column.

207 represents a rod of copper, brass, or other metal more expansible by heat than the material of the column 187 and pillar 181. This rod, being fixed at top in a spring, 208, and at bottom in the base 186 of the column, exerts a downward pressure, which increases under an increase of temperature, so as to resist undue pressure which the liquid in the pressure-chambers would develop from the same cause. The spring 208, to which the rod is attached, is fixed to a stud or standard, 209, at its rear end, and held at its central part by an adjustable post, 210, threaded as shown, and clamped, by means of nuts 211 212, within a slot in the scale-frame 213, so that the post may be adjusted horizontally to regulate the stiffness of the spring.

The scale-frame 213 may be cast with or permanently secured to the pillar 181. At the weight end of the scale a standard, 214, rises from the frame, affording attachment for a suspension-plate, 215, connected, through a hanger, 216, and second thin flexible plate, 217, with a fulcrum-block, 218, which is bored to receive the indicator-rod 219, and is attached by thin-plate connections 220 to the extremity of the beam 203. The indicator-rod carries on its projecting rear end an adjustable block, 221$^a$, fixed in position by a set-screw, 221$^b$, and supporting a standard, 221, and vertically-adjustable counter-weight 222 for regulating the sensitiveness of the scale, and secured in position by a thread on the rod 221, or by a set-screw, 222$^c$.

223 represents a tare-weight sliding on the rod for approximately balancing the scale. More accurate balancing is effected by the use of the weight 224, sliding on a weight-rod, 225, attached to the main beam. The end of the indicator-rod is notched, as shown at 226, Fig. 26, and works within a vertical slotted guide, 227, provided with an adjustable stop, 228, to limit the vertical motion. It is preferred to form a thread on the rod, as shown in Fig. 27, and provide it with a pair of stop-nuts, 229.

230 represents a graduated indicator-plate to show accurately the position of the rod.

The main beam is graduated, as shown at 231, for the purpose of weighing up to one thousand pounds, for example, by the use of a sliding weight, 232. A smaller weight, 234, sliding on the rod 225, may be used, in connection with the graduations 233, to indicate pounds and fractions thereof. A bar, 235, suspended from the end of the beam by flexible plates 236, receives the main weights 237, the value of which may be read by the figures directly at the top of each as it is placed in position.

For the attachment of the thin flexible plates 220 and 236, the end of the beam is provided with a block or lug, 203$^b$, made wide laterally, as shown in Fig. 24. A similar lateral extension is provided at the heel of the beam for the reception of the fulcrum-block 201 and transmitting-plate 204. In these blocks or lateral extensions the weight-rod 225 is mounted.

To secure the weight end of the beam against lateral movement, a flexible rod or plate, 238, is secured at one end to the stationary frame or case, and at the other end, by a screw, 239, (shown in dotted lines in Fig. 24,) or by other suitable means, to the wide lug or block at the end of the beam 203. A similar rod, 238$^a$, secured at one end to the stationary frame or case and at the other end, by a screw, 239$^a$, or other means, to the fulcrum-holder 218 of the indicator-rod 219, secures this rod against lateral motion. These rods or plates may be round, square, or flat, as preferred. They are preferably passed through cavities, as shown, and fixed by screws 240 240$^a$, or other means, to the frame or case. The attachments are made at or near the extremities of the rods or plates to give them the necessary freedom for vertical flexure or torsional motion, as the case may be.

The mode of setting the flexible fulcrum-plates in recesses or rabbets in the clamp-plates which hold them, or in the parts to be connected, affords a convenient and accurate mode of gaging the depth of their insertion. Such plates being prepared, a large number together, of accurately uniform width, have only to be pressed home upon the bottom of the notches and clamped by the clamp-plates to insure the proper adjustment and proximity of the separated parts. The interposition of the intermediate column, 205, with flexible joints between the head of the main pressure-column and the beam, permits the horizontal play of the joint 204, which is necessary where the fulcrums 199 and 204 are on different levels.

It is found beneficial to have the fulcrum 199 and transmitting-joint 204 at different heights, for the following reasons: Under increased pressure the diaphragms are found to offer increased resistance to their deflection, produced by the motion of the pressure-column under oscillations of the beam; but by placing the fulcrums of the beam on different levels it will be observed that as the beam is elevated it becomes a lever of decreasing power by the increase in length of its short arm, and in like manner as it is lowered it becomes a lever of increasing power. This gives to the predominating one of the two opposing forces increasing power in the direction in which motion occurs, and this increasing power is augmented in correspondence with the increase of pressure and compensates for the increased resistance of the diaphragms. By this means the sensitiveness of the scale is preserved under heavy loads.

In scales for very heavy loads the support may be either simple, as shown in Figs. 20, 216$^a$, and 216$^b$, or it may be compound, as shown in other applications of even date herewith.

Figs. 217$^a$ and 218$^a$ both show the method of connecting the diaphragm 166 and chamber-lining 1265 where they are soldered together at their outer bent edges. Fig. 21 7ª shows on a larger scale an annular diaphragm, 166, and an annular lining-ring, 1265, soldered together and to the pressure-column 167 and chamber-base 163, respectively. It also shows the conducting-plug 1381, soldered to the lining 1265. Fig. 17ª is a front elevation of a weigh-beam and accessories suitable for a very large scale, those here shown being for a scale of one million pounds capacity.

The beam 203 carries at its right-hand end the poise-rod 235, which has provided for it weights 237, sufficient to balance nine hundred thousand pounds on the platform.

To the left-hand end of the beam 203 is secured the supplementary weight-beam 203ª, consisting of two parts—one passing in front and the other to the rear of the fulcrum-block or standard 197—and having attached to their outer ends a clamp-plate, to which the weight-rod 235ª is suspended by a thin flexible plate or plates, 236ª.

On the lower end of the weight-rod 235ª is a platform which carries weights 237ª, sufficient in number and size to balance one hundred thousand pounds on the platform of the scale. The scale is balanced before loading with these weights 237ª, all in position on the weight-rod 235ª, when a load of one hundred thousand pounds placed on the platform will be balanced by their removal. This permits the addition or removal of weights to balance one hundred thousand pounds, or any fractional part thereof, without removing or adding to the weights 237 of the weight-rod 235, so that no disturbance of the weights for even hundreds of thousands is made for weighing the fractional parts of one hundred thousand pounds.

The lower ends of the weight-rods are received within recessed plates attached to the frame and permitting limited lateral movement to the said weight-rods, but without contact in the normal position of the weight-rods.

The beam 203 is provided with a sliding weight, 232, with graduations in even hundreds for ten thousand pounds, and with a sliding weight, 234, with graduations by pounds up to one hundred pounds. It will thus be seen that when a load upon the scale is balanced by the weights 237, 237ª, 232, and 234 the aggregate amount of such load will be read directly from the markings on the weight-rods 235 235ª and beam 203 without any additions or subtractions, the hundreds of thousands being shown by the figures at the top of the upper weight remaining on the rod 235, the tens of thousands by the figures at the top of the uppermost weight, 237ª, on the rod 235ª, the thousands and hundreds by the position of the weight 232 on the beam 203, and the tens and units by the position of the weight 234 on the beam 203.

In cases where it is undesirable to apply to the column or columns acting on the weigh-beam the full pressure derived from the platform-supports, I interpose an apparatus termed a "reducer," consisting of a column or columns mounted by plates or diaphragms within a suitable casing, so as to receive at one end the pressure derived from the platform-supports, through the small chambers connected therewith, and transmit from the other end pressure, reduced in any desired proportion, through the medium of a liquid chamber or chambers or suitably-arranged levers, all which I have fully described under different modifications in other applications of even date herewith.

Whatever novel subject-matter I have set forth and not claimed or attempted to claim herein I have claimed or attempted to claim in other applications, or have reserved to be claimed in future original applications.

The following is claimed as new:

1. The fixing-plates 173, secured by keys and solder, as described, to lugs 174 175, attached to the platform and bed or frame, respectively.

2. The combination, with the fixing-plates 173, platform 162, and bed 161, of the screws 176 for straining the plates or adjusting the platform in horizontal position, as explained.

3. In combination with the pillar-base 180, and with the pressure-column 187, of a scale or reducer, one or more transmitting pressure-chambers separately removable, and each consisting of a chambered piece, 179, diaphragm 182, ring 183, and small pressure-column 185, as and for the purposes set forth.

4. The combination of a liquid-pressure pipe, 165, leading from a hydraulic support or reducer, the pressure-chamber 179, and the coupling and sealing plug 178 for connecting them, as herein set forth.

5. The plate 186, secured by a central screw, 190, to the bottom of the pressure-column 187, serving to attach the fixing-plate 188 thereto, as described.

6. In combination with the pillar-base 180 and column 187, the combined set-screws 192 and 191, engaging respectively with the pillar-base and with the bottom of the column, or its plate-screw 190, for adjusting or fixing the column in position.

7. The screw-head 193 and the diaphragm 194, attached thereby, in combination with the pressure-column 187, as set forth.

8. A thin flexible fulcrum-plate fixed in position by means of a gaging shoulder or recess and a clamp-plate, substantially as set forth.

9. The combination, with the pillar 181, of the removable pillar-head 195, with projecting lug 197, the thin fulcrum-plate 199, clamp-plates 198 200, and fulcrum-block 201 for attaching the beam 203 to the pillar, as set forth.

10. The combination, with the column-head 193, and the beam 203, and fulcrum-block 201, of the intermediate column, 205, connected by thin plates 204 206, as and for the purpose set forth.

11. The combination, with the pillar or pillar-head 195, pressure-column 187 or its jointed head 193, and beam 203, of the fulcrum and transmitting plates 199 and 204, applied on different levels, as and for the purposes explained.

12. The combination, with a pressure-column, 187, of a rod, 207, and spring 208 for compensating for changes in temperature, as set forth.

13. The combination, with the rod 207 and spring 208 for compensating for changes in temperature, of the adjusting-screw 210, for the purposes set forth.

14. The combination, with the beam 203, provided with one or more weighing-weights, of the supplemental weight-rod 225, carrying one or more balance-weights and one or more weighing-weights, as and for the purposes set forth.

15. In a platform-scale, in combination with a beam and a weight-rod, firmly on which weights are placed to balance a load on the platform, a supplementary weight-rod suspended from the beam, on the opposite side of the fixed fulcrum, by thin-plate connections, and carrying weights which are removed to balance a load on the platform, substantially as set forth.

16. In a platform-scale, the combination of the beam 203, weight-rods 235 235*, and weights 232 234 237 237*, said beam and weight-rods being graduated, substantially as described, whereby the load which is weighed is read directly from the weight-rods and beam without addition or subtraction, substantially as set forth.

17. The combination, with one or more weight-beams, of an indicator-rod connected to one of said beams by one or more thin flexible fulcrum-plates, and having greater angular motion than the weight-beam to which it is connected.

18. The combination of the indicator-rod 219, longitudinally adjustable in the holding-block 218, and the thin attaching-plates 217 220, as and for the purposes set forth.

19. The combination, with the indicator-rod 219, of the adjustable attaching-block 221ª, standard 221, and vertically-adjustable weight 222, substantially as and for the purposes set forth.

20. The combination, with the pillar-head 195 and beam 203, of the indicator-rod 219, indicator-plate 230, and guide 227, said indicator-plate and guide being attached either to the pillar-head or beam, or one to each, as preferred.

21. The indicator-rod provided with one or more stops to prevent or limit longitudinal motion, as set forth.

22. The combination, with the weight end of the main beam, of a flexible rod or plate, 238, attached at one end to the frame or case and at the other end to the beam, to secure it against lateral movement, as described.

23. The combination, with the fulcrum attachment 218 of the indicator-rod or secondary beam 219, of a flexible rod or plate, 238ª, attached at one end to the frame or case and at the other end to the fulcrum attachment of the indicator-rod, to secure it against lateral movement, as described.

24. In a weighing-machine, the combination of a weight-beam and an indicator-rod having greater angular motion than said beam.

25. The combination, with a weight-beam, of an indicator-rod, 219, having greater angular motion than said beam, and a weight counterbalancing said indicator-rod, substantially as set forth.

ALBERT H. EMERY.

Witnesses:
OCTAVIUS KNIGHT,
MAHLON RANDOLPH.